Figure 1:
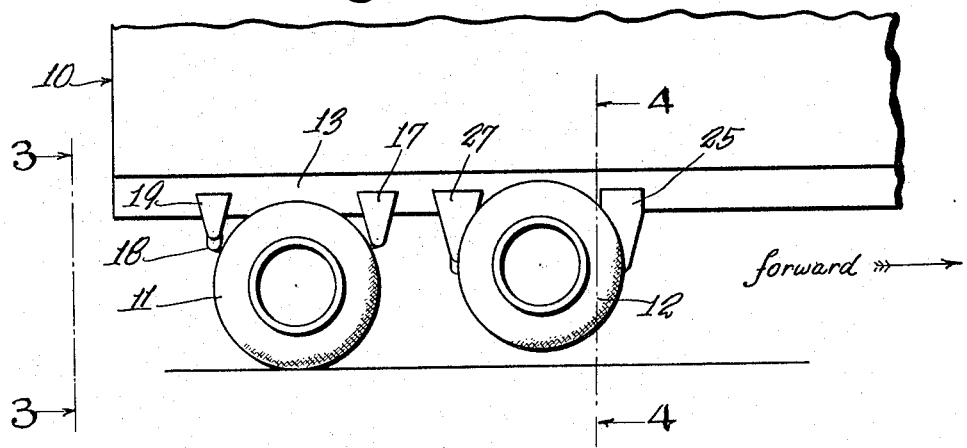

Nov. 15, 1966  S. TURNER, JR  3,285,621

WHEELED VEHICLE SUSPENSION

Filed Jan. 12, 1965  4 Sheets-Sheet 1

INVENTOR.
STEPHEN TURNER, JR.
BY
Williams and Kresler
ATTORNEYS

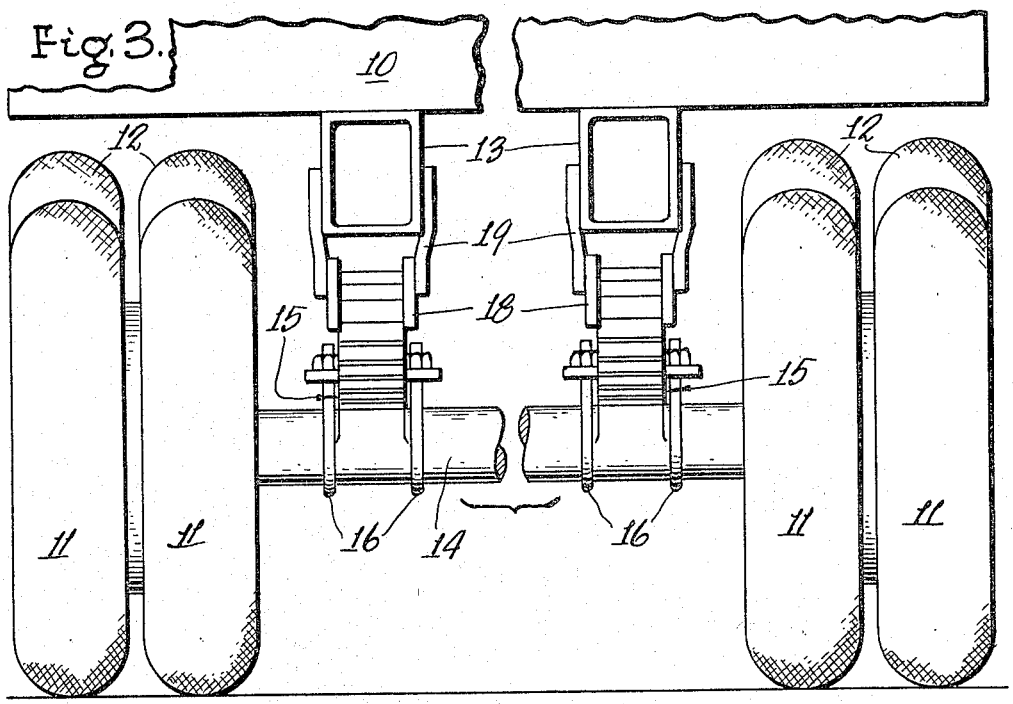
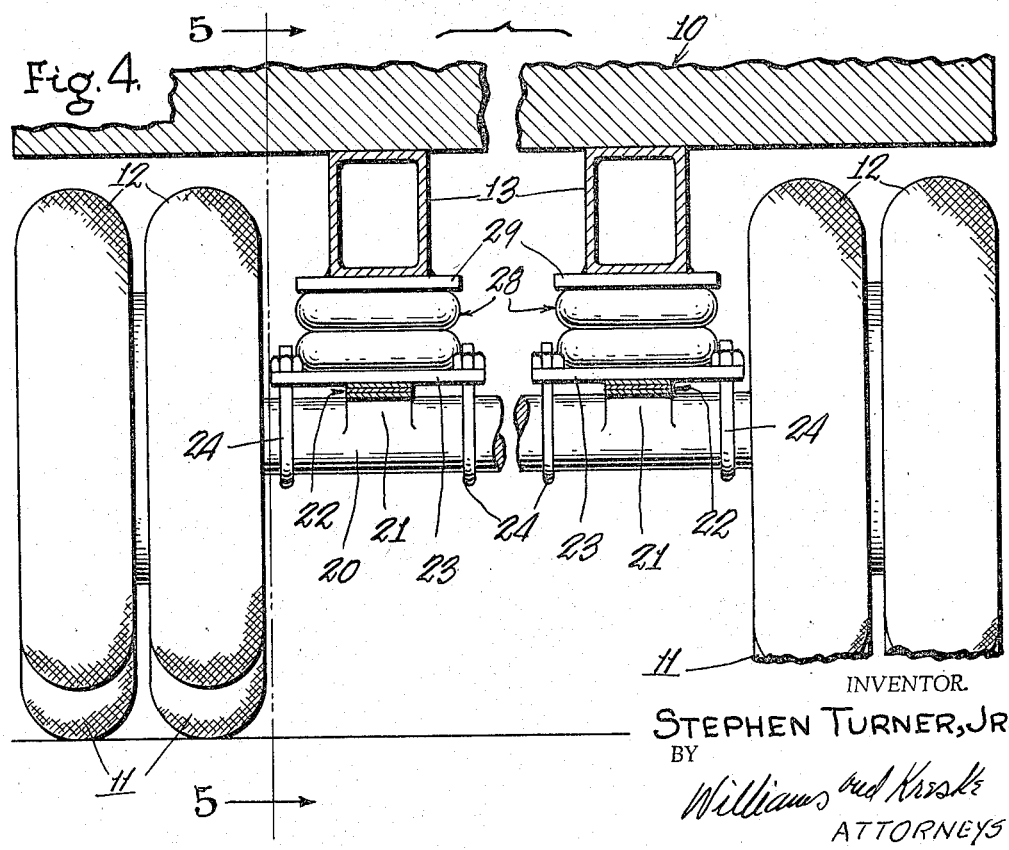

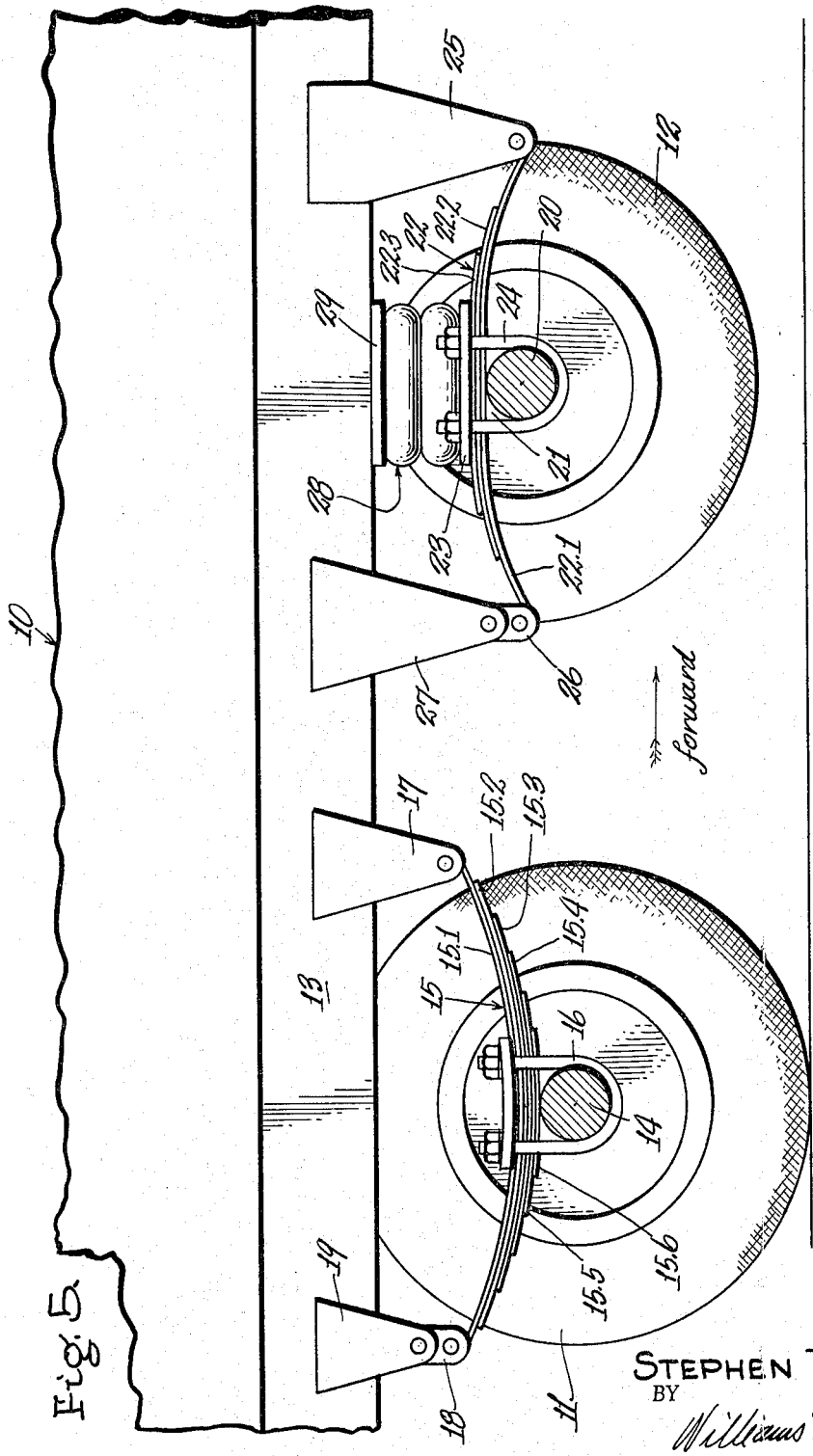

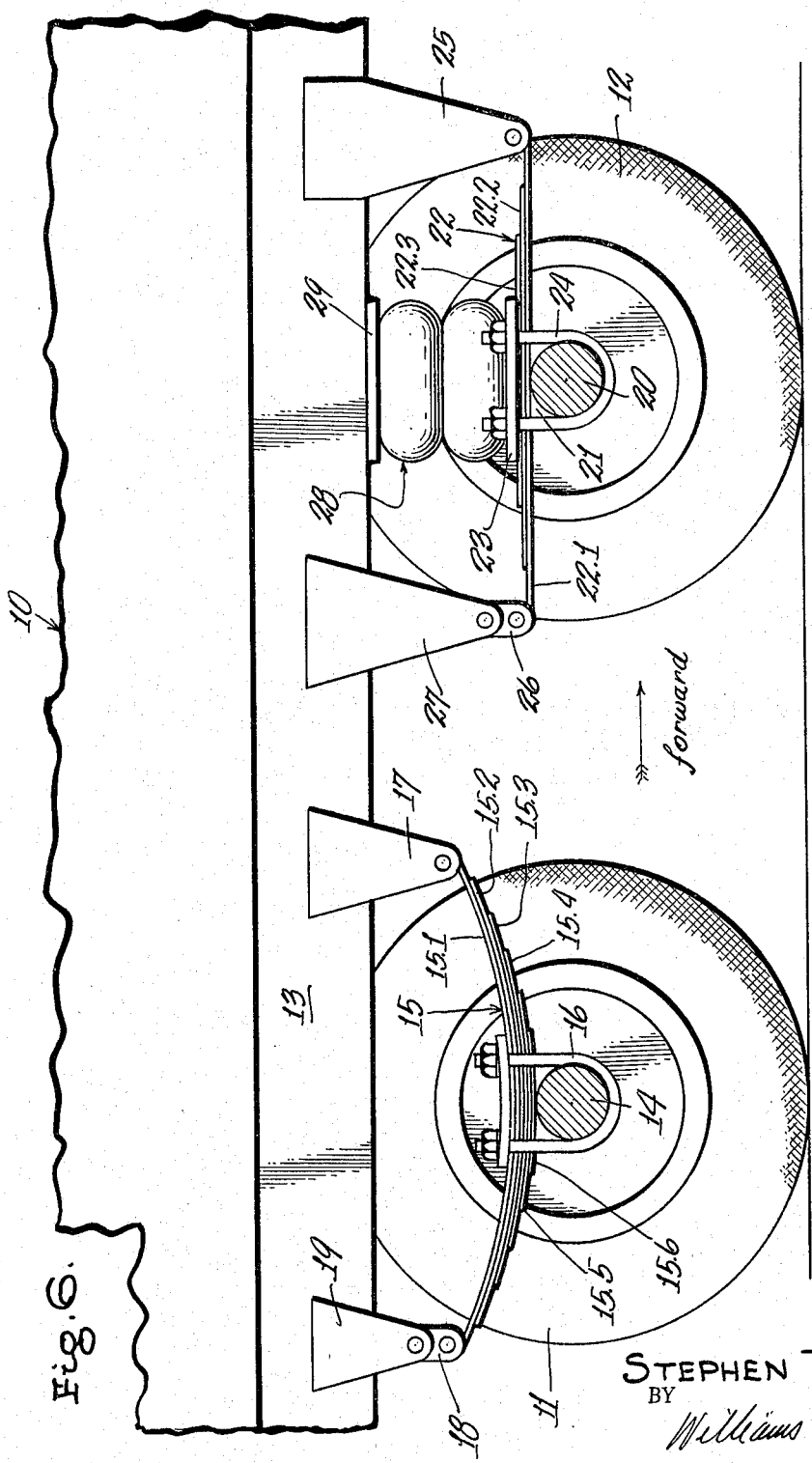

United States Patent Office 3,285,621
Patented Nov. 15, 1966

3,285,621
WHEELED VEHICLE SUSPENSION
Stephen Turner, Jr., 6611 Belmont Ave., Girard, Ohio
Filed Jan. 12, 1965, Ser. No. 424,933
3 Claims. (Cl. 280—81)

The present invention relates to wheeled vehicles, more particularly to suspensions for wheeled vehicles such as trucks and trailers, and the principal object of the invention it to provide new and improved vehicular suspensions.

It is well-known that in a load-carrying wheeled vehicle, the greater the number of load-carrying wheels, the greater the load which can be carried without damage to the road surface. Indeed, while most states limit the gross weight of a vehicle traveling on state roads, many states specify a gross weight which each axle of the vehicle may support. In such cases, it follows that the greater the number of wheel-bearing axles on the vehicle, the greater will be the allowed gross weight. Unfortunately, the greater the number of axles spaced longitudinally of the vehicle, the greater the tire scuffing when the vehicle turns and the greater the power requirements to overcome the drag of such scuffing.

In order to alleviate the aforesaid tire scuffing when multiple axle suspensions are employed, it has been proposed to steer or caster one or more of such multiple axles. This, however, is a very complex and expensive solution which is not always adaptable to existing vehicles.

Another proposed solution to multiple-axle tire scuffing aforesaid, and that contemplated by the present invention, is to provide one or more auxiliary axles on the vehicle which can be selectively used only when necessary. Thus, when a light load is being carried, the auxiliary axle may be raised to elevate its wheels above the road surface. On the other hand, when the additional load-carrying capacity of such auxiliary axle is required, the axle may be lowered to bring its wheels to engagement with the road surface with sufficient force that such axle will carry its proportionate share of the vehicle load. Tire wear on the auxiliary axle, therefore, will not occur when loads are light and the auxiliary axle is not in use. While at first glance it may appear that non-use of an auxiliary axle only during light-load vehicle operation would not greatly help the tire scuffing problem, it should be kept in mind that many vehicles travel lightly loaded about the same distance as they travel heavily loaded. Furthermore, when heavily loaded, vehicles tend to travel at a lower speed thus making tire scuffing less of a problem than it is at higher speeds.

Figure 2:
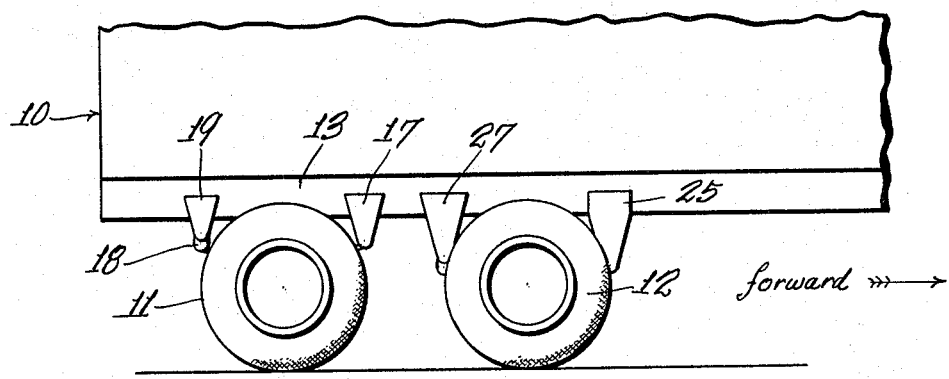
Figure 7:
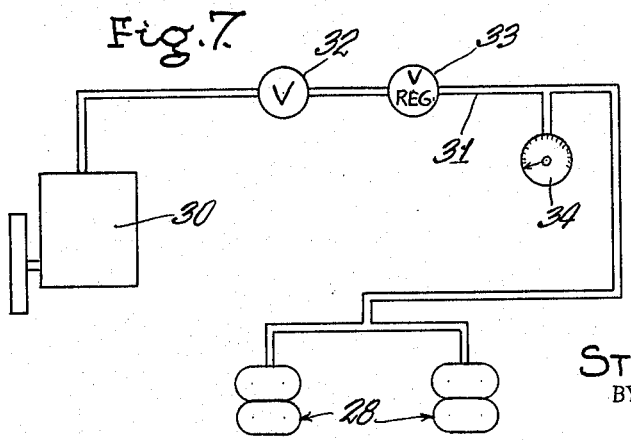

By utilizing the principle of an auxiliary vehicle axle which is selectively shiftable toward and away from the road surface, the present invention provides for increased load capacity of the vehicle while minimizing tire scuffing, power consumption and limitations on maneuverability of the vehicle. These and other advantages will readily become apparent from a study of the following description and from the drawings appended hereto, and in these drawings:

FIGURE 1 is a fragmentary, side elevational view of the rear portion of a vehicle embodying the present invention, the auxiliary axle of the present invention being shown in a non-supporting position relative to the vehicle, FIGURE 2 is a view similar to FIGURE 1 but with the auxiliary axle of the present invention being shown in a supporting position relative to the vehicle, FIGURE 3 is a broken, enlarged fragmentary rear elevational view generally corresponding to the line 3—3 of FIGURE 1, FIGURE 4 is a broken, enlarged fragmentary sectional view generally corresponding to the line 4—4 of FIGURE 1, FIGURE 5 is a fragmentary sectional view generally corresponding to the line 5—5 of FIGURE 4, FIGURE 6 is a view similar to FIGURE 5 but with parts shown in another position, and FIGURE 7 is a diagrammatic view of means for controlling operation of the auxiliary axle shown herein.

With reference to FIGURES 1 and 2, a wheeled vehicle, such as a semi-trailer 10 having the usual supporting wheels 11, is fragmentarily shown. Mounted ahead of the supporting wheels 11, in the position of parts shown, is another set of wheels 12 which may selectively be positioned in the non-supporting position seen in FIGURE 1 or in the supporting position seen in FIGURE 2. As best seen in FIGURES 3 and 5, the trailer 10 has the usual pair of longitudinally extending frame members 13 in side-by-side relation to which the wheels 11 are secured. Wheels 11 are herein shown to comprise dual wheels rotatably mounted in axially spaced relation to an axle 14 whereby respective dual wheels are disposed on opposite sides of the trailer.

Any conventional means may be employed to resiliently secure the axle 14 to the frame members 13. For example, in the present embodiment, a pair of leaf springs 15 underlie respective frame members and have their intermediate portions secured to respective axle portions by means of U bolts 16. The forward end of each leaf spring 15 is pivotally secured to respective brackets 17 depending from respective frame members while the rear end of each leaf spring is pivotally secured via a shackle 18 to respective brackets 19 depending from respective frame members 13. In accordance with conventional practise, it will be noted that each spring 15 is formed of an upper, main leaf 15.1 and a plurality of progressively shorter, secondary leaves 15.2, 15.3, 15.4, 15.5 and 15.6 underlying such main leaf.

Wheels 14, and with reference to FIGURES 4 and 5, are herein shown to comprise dual wheels rotatably mounted in axially spaced relation on an axle 20 which may be similar to axle 14. Axle 20 has upwardly facing spring seats 21 to which are secured the intermediate portions of respective leaf springs 22 which underlie respective frame members 13. For a purpose to appear, a relatively large metal plate 23 overlies each spring 22 and U bolts 24 draw the plates toward the axle to secure said springs thereto. In a manner similar to spring 15, each spring 22 has its forward end pivotally secured to respective brackets 25 depending from respective frame members 13 and the rear end of each is pivotally secured via a shackle 26 to respective brackets 27 depending from respective frame members.

Spring 22 differs from spring 15 in that while it is shown to be formed of a main leaf 22.1 and progressively shorter secondary leaves 22.2, 22.3 the main leaf 22.1 is lowermost rather than uppermost. Thus, while the spring 15 normally urges its axle downwardly away from the frame members 13, spring 22 functions in a reverse manner to normally urge its axle upwardly toward the frame members 13 whereby the wheels 12 are spaced above the underlying road surface as clearly illustrated in FIGURES 1, 4 and 5. Since springs 22 need only exert sufficient force to support the weight of axle 20 and its wheels 12, each spring 22 is shown to be formed of only the two secondary leaves previously mentioned in addition to the main leaf.

In view of the fact that springs 22 normally maintain the axle 20 in the position seen in FIGURES 1, 4, and 5 wherein the wheels 12 are supported above and out of engagement with the underlying road surface, means are provided to overcome the force of springs 22 to urge the wheels 12 downwardly to engagement with the road surface whereby such wheels will carry a proportionate share of the weight of the vehicle. As viewed in FIGURES 4 and 5, a pair of vertically extensible (in the position of parts shown) bellows or air bags 28 are employed for urging the wheels 12 of axle 20 to road engagement. The air bags 28 are preferably interposed between the axle 20 and respective frame members 13, the lower end of each air bag being seated upon respective plates 23 and the upper end of each being seated against plates 29 welded or otherwise secured to the underside of respective frame members.

With the construction thus far disclosed and as best seen in FIGURES 1 and 5 wherein the parts are illustrated in normal position, it will be noted that the wheels 12 are elevated above the road surface in a non-use position. This will normally be the position of wheels 12 when the vehicle is either empty, lightly loaded, or whenever the additional load capacity of the wheels 12 is not required.

When, however, it is desired to employ the additional load capacity of the wheels 12, compressed air will be admitted to the air bags 28 to cause vertical extension thereof thus urging the wheels 12 downwardly against the relatively light force exerted by the springs 22 to engagement with the road surface as shown in FIGURES 2 and 6. Preferably, the amount of air pressure admitted to the air bags 28 will be such that the wheels 12 will be forced downwardly an amount to carry their proportionate share of the vehicle load. This, of course, divides the load of the vehicle between the two sets of wheels 11 and 12 in any desired proportion. When use of the wheels 12 is no longer required, air will be released from the air bags whereupon the springs 22 will return the wheels 12 to the position seen in FIGURES 1 and 5.

As a source of air pressure for the bags 28 and with reference to FIGURE 7, the tractor which draws the trailer herein shown may carry the usual engine driven compressor 30 having suitable conduit connection 31 with the air bags. Interposed in the conduit 31 and preferably disposed in the cab of the tractor for ease of operation by the driver is a manual control valve 32, an adjustable, pressure regulating valve 33, and a gauge 34 which shows the air pressure within the air bags. Valve 32, of course, controls admission to or release of air pressure from the air bags, valve 33 controls the amount of air pressure admitted to the air bags, and guage 34 indicates the amount of air pressure in the air bags thus informing the driver of the degree of load support provided by the wheels 12.

It is to be understood that while a single auxiliary axle 20 has herein been shown and described as being applied to a semi-trailer having a single main axle, this has been done for illustration only and more than one such auxiliary axle may be applied to trailers of any type having one, two or more main axles. Moreover, the auxiliary axle herein shown is not limited to application to trailers but may as well be applied to trucks, tractors or other vehicles having any number of main axles.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. A wheeled vehicle having longitudinally extending frame members in side-by-side relation and each frame member being disposed adjacent a respective side of said vehicle, first and second axles underlying said frame members and extending transversely thereof, said axles being spaced from each other longitudinally of said vehicle and each mounting wheels along which the vehicle may travel, means connecting said first axle to said frame members whereby said first axle provides a primary means of vehicle support, a leaf spring on each side of said vehicle adjacent respective frame members and extending longitudinally thereof, each leaf spring having its end portions secured to respective frame members and having its intermediate portion overlying and secured to said second axle, said leaf springs cooperating to normally bias said second axle upwardly to raise the wheels mounted thereon above the surface along which the vehicle travels, vertically flexible pneumatic chambers extending between respective frame members and said second axle, and means for selectively applying pneumatic pressure to said chambers to cause vertical elongation thereof thus biasing said second axle downwardly against the force exerted by said springs to lower the wheels mounted thereon to forceable engagement with the vehicle travel surface.

2. The construction of claim 1 wherein each leaf spring is formed of an elongated main leaf whose ends are secured to respective frame members and an auxiliary leaf secured to the upper side of a respective main leaf and shorter in length than the latter.

3. In a wheeled vehicle, the combination comprising first and second axles extending transversely of said vehicle and spaced from each other longitudinally thereof and each mounting wheels on opposite sides of said vehicle along which the latter may travel, means connecting said first axle to said vehicle whereby said first axle and the wheels mounted thereon provide a primary means of vehicle support, a pair of leaf springs extending longitudinally of said vehicle on opposite sides thereof, each leaf spring having its end portions secured to said vehicle and its intermediate portion secured to said second axle and said leaf springs being mounted to normally exert a force which elevates said second axle and which raises the wheels mounted thereon above the surface along which the vehicle travels, a pair of extensible-retractable pneumatic motors on opposite sides of said vehicle and connecting said second axle to the latter, and means for selectively applying pneumatic pressure to said motors and forcing said second axle downwardly against the force exerted by said springs thereby lowering the wheels mounted on said second axle to forceable engagement with said vehicle travel surface.

References Cited by the Examiner

UNITED STATES PATENTS

| | | | |
|---|---|---|---|
| 2,902,289 | 9/1959 | North | 280—81 |
| 2,989,300 | 6/1961 | Johannsen | 267—31 |
| 3,063,732 | 11/1962 | Harbers et al. | 267—65 X |
| 3,093,388 | 6/1963 | Kulyk | 267—37 X |

References Cited by the Applicant

UNITED STATES PATENTS

| | | |
|---|---|---|
| 2,391,948 | 1/1946 | Couse. |
| 2,698,758 | 1/1955 | Ronning. |
| 3,096,995 | 7/1963 | Richnow. |
| 3,133,745 | 5/1964 | Granning. |

KENNETH H. BETTS, *Primary Examiner.*